Oct. 7, 1958  J. G. FISHER  2,854,823
IRRIGATION DITCH VALVE
Filed March 22, 1954  2 Sheets-Sheet 1
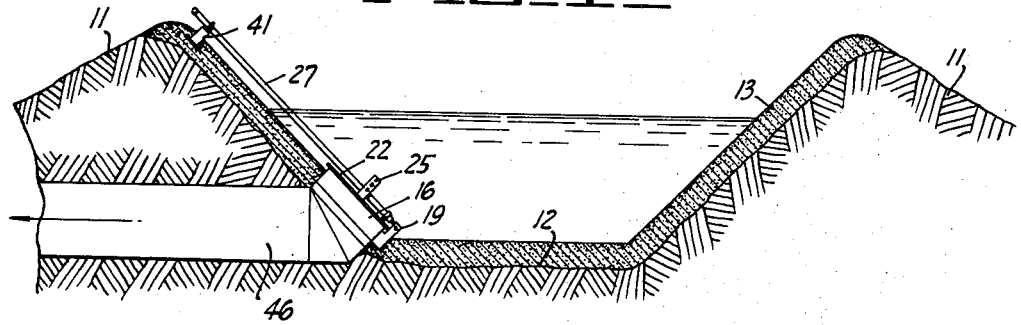
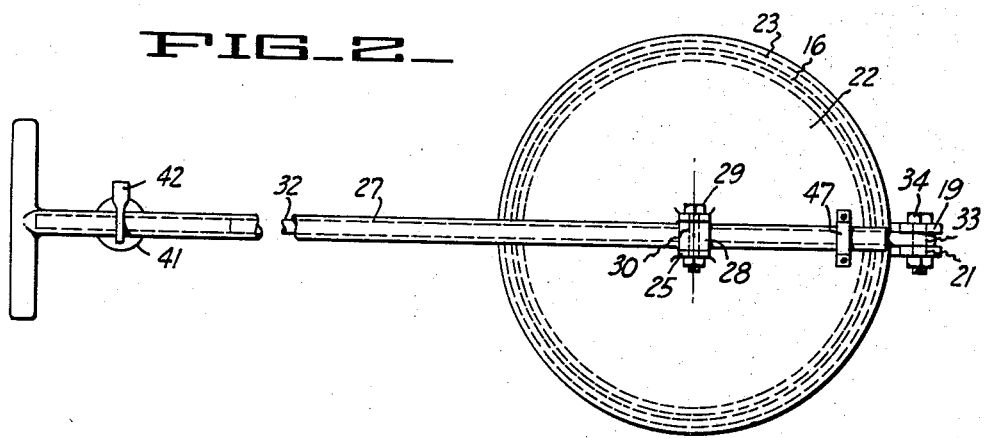
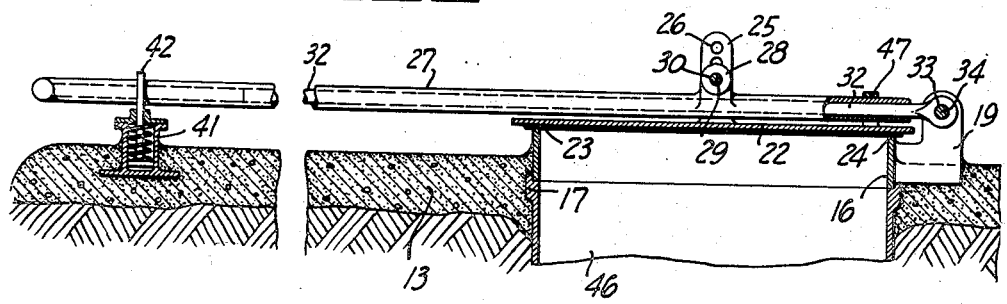
INVENTOR.
John G. Fisher
BY
ATTORNEYS Oct. 7, 1958 J. G. FISHER 2,854,823
IRRIGATION DITCH VALVE
Filed March 22, 1954 2 Sheets-Sheet 2
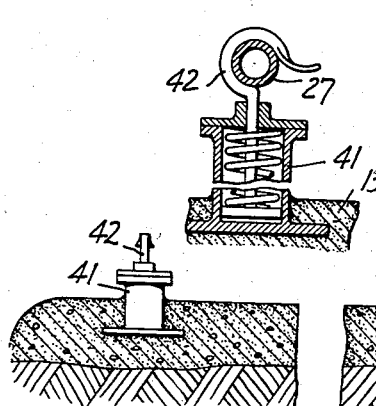
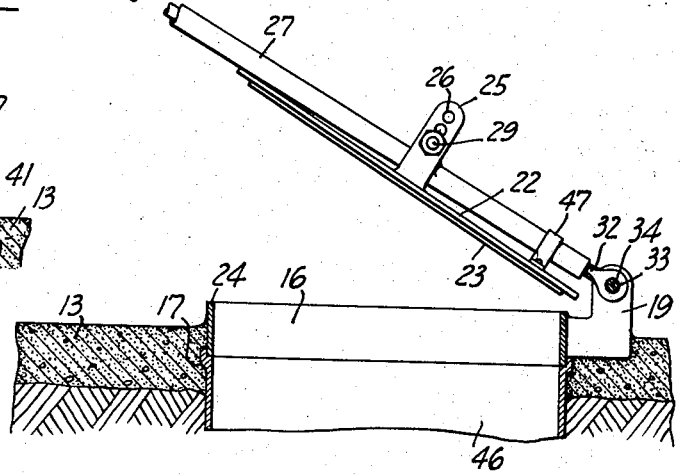
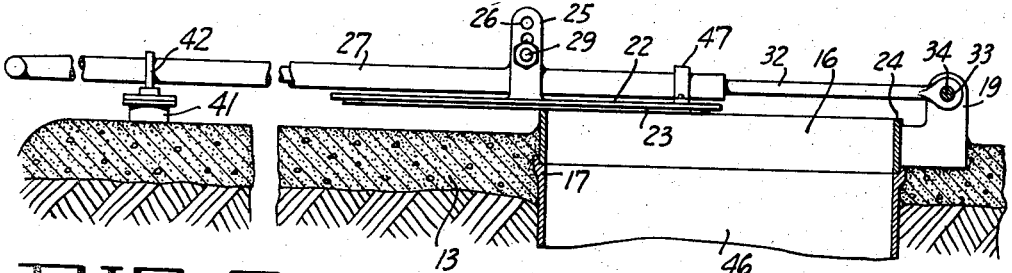
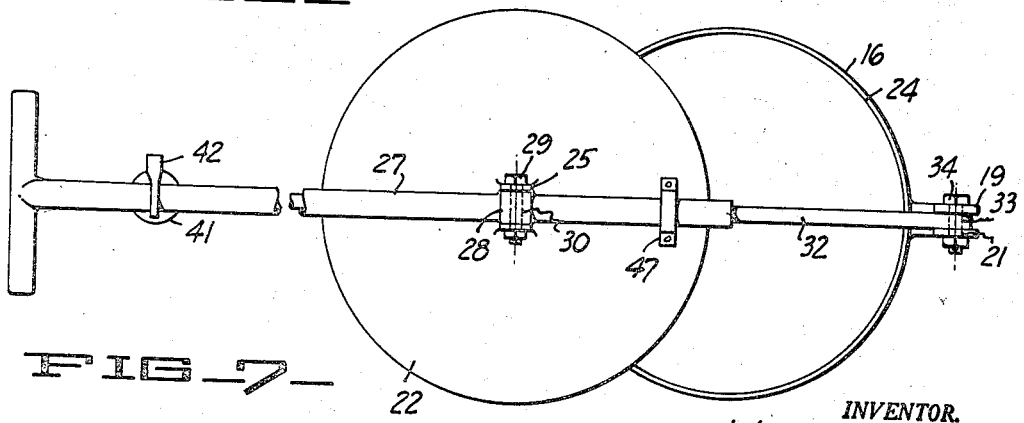
INVENTOR.
John G. Fisher
BY
ATTORNEYS //
United States Patent Office 2,854,823
Patented Oct. 7, 1958

2,854,823

IRRIGATION DITCH VALVE

John G. Fisher, Yuma, Ariz.

Application March 22, 1954, Serial No. 417,829

3 Claims. (Cl. 61—28)

This invention relates to valves and more particularly to valves for irrigation ditches.

In the irrigation of land from an irrigation ditch, it has been difficult to take a predetermined quantity of water from the irrigation ditch and place it upon the land to be irrigated. Conventionally, the water was taken off by the use of siphon tubes or by ditches cut into the berm and the concrete ditch, but with these devices it was often difficult to control the rate of flow.

In some instances, irrigation valves have been used, but the valves are not watertight and they are also objectionable in that they are difficult to open to a full open position. In order to obtain a full flow of water from these valves, it is necessary to remove the valves from the ditch and then replace them when it is desired to stop the flow of water. To do this it is often necessary for the operator to get into the ditch and thereby getting himself wet.

In general it is an object of the present invention to provide an irrigation ditch valve which can be used to regulate the flow of water from a ditch and which will eliminate the above mentioned difficulties.

Another object of the invention is to provide an irrigation ditch valve which can be easily operated to a fully open or fully closed position and which can be set at any intermediate position.

Another object of this invention is to provide an irrigation ditch valve which will be watertight so as to prevent leakage from the irrigation ditch.

A further object of the invention is to provide a heavy duty irrigation ditch valve which is very economical to construct.

Further objects and advantages of the invention will appear from the following description taken in conjunction with the accompanying drawings.

Referring to the drawings:

Figure 1 is a cross-sectional view of an irrigation ditch with my irrigation ditch valve in place.

Figure 2 is a plan view of my irrigation ditch valve.

Figure 3 is a cross-sectional view of my irrigation ditch valve.

Figure 4 is a view showing my irrigation valve just after the seal has been broken when it is desired to move the valve from a fully closed position.

Figure 5 is a cross-sectional detail view of the latching mechanism for holding the handle of my irrigation ditch valve.

Figure 6 is a cross-sectional view showing my irrigation ditch valve in a partially opened positioned with the handle latched in place so that the valve will remain in that position.

Figure 7 is a plan view also showing my irrigation ditch valve latched into a partially opened position.

In general, my invention consists of a valve member which can be moved into and out of engagement with a valve seat ring embedded in the wall of the concrete ditch.

It is well known that when a conventional concrete ditch is to be installed that the land on which the ditch is to extend is first levelled and that a raised berm 11 is formed. The ditch 12 is then formed in the berm 11, to the shape required, by a suitable ditching machine so that the earth on the bottom sides and edges is firm and compacted. The ditch so formed is then lined with concrete by any suitable means to form the concrete ditch 13.

At the time the concrete ditch 13 is being poured, the circular valve seat ring 16 is put in place. Suitable reinforcing 17 may be provided to firmly retain the valve seat ring 16 in the concrete after it has hardened.

A mounting 19 is welded on the outer circumference of the valve seat ring 16 for a purpose hereinafter to be described. The mounting 19 is a U-shaped member having aligned holes 21 situated at its upper extremity.

A circular valve member 22 is provided to engage the valve seat ring 16. The inner surface of the valve member 22 is provided with an annular gasket 23 which is adapted to engage the upper lip 24 of the valve seat ring 16. The gasket may be made of any suitable resilient material such as rubber.

The valve member 22 is provided with a U-shaped member 25 which is welded to the center of the upper surface of the valve member. This U-shaped member 25 is provided with a plurality of parallel aligned holes 26 for a use hereinafter to be explained.

A handle 27 is provided for operating the valve member 22. This handle 27 has a fitting 28 provided with an eye 30 which is adapted to be aligned with the holes 26 on the U-shaped member 25 so that fitting 28 may be fastened to the valve member 22 by means of bolt 29. It is readily apparent that the position of the handle 27 relative to the valve member 22 may be adjusted by using different holes 26 in the U-shaped member 25.

The handle 27 is in the form of a long cylindrical pipe and is adapted to slidably engage the rod 32. The rod 32 is provided with an eye 33 that is adapted to be aligned with the holes 21 in the U-shaped mounting 19. The rod 32 is removably secured to the mounting 19 by bolt 34. It is apparent from the drawings that the rod 32 is of substantial length so that the handle 27 may be slidably reciprocated for substantial distances along the rod 32 without disengaging the rod.

Any suitable means may be used for holding the handle 27 in a predetermined position. One device found to be particularly satisfactory is shown in Figure 5 and consists of the chamber 41 which is embedded in the concrete wall of the ditch. Chamber 41 houses a spring engaged hook 42. The hook is so shaped that it will engage the handle 27 and hold it in any predetermined position.

Operation of the device described above is as follows: Assuming that my irrigation ditch valve is in the closed position as shown in Figure 2 and that it is desired to open the valve to let water flow from the ditch 13, the following procedure is used. The handle 27 is first disengaged from the hook 42 and then the valve member 22 is lifted away from the valve seat ring 16 as shown in Figure 4 to break the seal between the gasket 23 and the valve seat ring 16. The valve member 22 is also lifted away from the valve seat ring 16 to facilitate longitudinal movement of the handle 28 upon the rod 32.

After the seal has been broken, the handle 27 is slid longitudinally on the rod 32 until the valve member 22 is in the desired position, for example, the position shown in Figure 6. After the valve member 22 has been opened sufficiently, the handle 27 is latched into this position by placing it under hook 42, thus serving to retain the valve member 22 in the desired position.

It is readily apparent from the foregoing explanation that the valve member 22 may be moved from any number of positions from a fully closed to a fully opened position to regulate the flow of water from the ditch 13.

As shown in Figure 1, any suitable conduit such as conduit 46 may be provided for the flow of water from my irrigation ditch valve to the berm 11 onto the land to be irrigated. It is also apparent that the conduit should be suitably bonded to the concrete irrigation ditch 13 to prevent erosion of the berm.

When it is desired to close my irrigation ditch valve, it is merely necessary to disengage the handle 27 from the hook 42. The handle 27 can then be lifted to disengage the gasket 23 from the valve seat ring whereupon the valve member 22 can be slid back into a closed position after which the handle 27 can be dropped and engaged with the hook 42 to hold it in place.

Additional means may be provided for retaining the valve member 22 in a substantially parallel position to the handle 27 such as a strap 47 loosely engaging handle 27 and suitably attached to valve member 22. Without this strap it has been found that the water pressure rotates the valve member 22 about the bolt 29 thus pulling one portion of the valve member into the valve seat ring 16 making it difficult to close. Addition of strap 47 serves to prevent this rotation of valve member 22 and thus facilitates closing of the member 22.

It will be apparent from the foregoing that I have provided a heavy duty irrigation ditch valve which can be easily and economically constructed. It is also apparent that the gasket 23 forms a watertight seal between the valve seat ring 16 and the valve member 22 to prevent leakage of water from the irrigation ditch. The holes 26 in the U-shaped member 25 provide a means for adjusting the position of the handle 27 relative to the valve member 22 so that if the valve member fails to properly seat against the valve seat ring, an adjustment can be made so that the valve member 22 will firmly engage the valve seat ring 16 when the handle 27 is retained by the hook 42.

It is also apparent from the foregoing that the valve member 22 can be moved to any number of positions between a fully closed position and a fully opened position and secured at those positions to thereby control the rate of flow from the irrigation ditch 13. This control can be obtained merely by operating the handle 27 and at no time is it necessary to enter the water to open or close the valve.

It is also apparent that the valve member 22 can be removed completely from the ditch by sliding it off of the rod 32. In this manner, weeds and the like may be removed without getting into the irrigation ditch. Removal of the valve member 22 in this manner also facilitates replacement of the gasket 23 whenever that becomes necessary.

I claim:

1. In an irrigation ditch valve mounted in the side of an irrigation ditch, a valve seat ring embedded in the side of said irrigation ditch, a valve member movable between open and closed positions in respect to said ring, said valve member in a closed position engaging the seat ring and closing the opening therethrough, an elongate member having one end pivotally mounted on said valve seat ring, an additional elongate member slidably mounted on the free end of said first named elongate member, a projection mounted on said additional elongate member and extending at right angles to said additional elongate member, said projection being mounted intermediate the ends of said additional elongate member, said projection having a plurality of holes spaced at increasing distances from said additional elongate member, means pivotally connecting said valve member to one of the holes in said projection, sealing means between said valve member and said valve seat ring to form a watertight seal between the same, said valve member being movable away from said valve seat ring about the pivotal connection joining the valve seat ring and said first named elongate member to break the seal between said valve member and said valve seat ring, said valve member being slidable longitudinally of the first named elongate member after the seal has been broken, and means retaining said valve member in any of a plurality of positions between a fully opened and a fully closed position, said means including means continuously urging said valve member into engagement with said valve seat ring.

2. In an irrigation ditch valve, a valve seat ring adapted to be positioned in a sidewall of an irrigation ditch, a valve member movable between open and closed positions in respect to said ring, said valve member in a closed position engaging the seat ring and closing the opening therethrough, sealing means between said valve member and said valve seat ring to form a watertight seal between the same, an elongate member having one end pivotally mounted on said valve seat ring, an additional elongate member slidably engaging said first named elongate member and having said valve member pivotally mounted thereon intermediate the ends thereof, said valve member being movable away from said seat ring about the pivotal connection between the first named elongate member and said valve seat ring to break the seal between said valve member and said valve seat ring, said valve member also being slidable longitudinally of the first named elongate member to move said valve member to an open position.

3. A valve as in claim 2 wherein the pivotal connection between said additional elongate member and said valve member comprises a projection extending at right angles to said additional elongate member, said projection having a plurality of holes spaced at increasing distances from said additional elongate member, and means for connecting said valve to a predetermined hole in said projection.

References Cited in the file of this patent

UNITED STATES PATENTS

| | | |
|---|---|---|
| 1,492,482 | Roots | Apr. 29, 1924 |
| 2,048,564 | Purlee | July 21, 1936 |
| 2,628,056 | Fuller | Feb. 10, 1953 |

FOREIGN PATENTS

| | | |
|---|---|---|
| 113,685 | Switzerland | of 1926 |

OTHER REFERENCES

Hydromechanics, Encyclopedia Britannica, 9th edition, page 479, 1889.